(12) United States Patent
Qin et al.

(10) Patent No.: US 7,856,002 B2
(45) Date of Patent: Dec. 21, 2010

(54) SYSTEM AND METHOD FOR WIRELESS COMMUNICATION HAVING A DEVICE COORDINATOR SELECTION CAPABILITY

(75) Inventors: Xiangping Qin, San Jose, CA (US);
Harkirat Singh, Santa Clara, CA (US);
Huai-Rong Shao, San Jose, CA (US);
Chiu Ngo, San Francisco, CA (US)

(73) Assignee: Samsung Electronic Co., Ltd., Suwon (KR)

( * ) Notice: Subject to any disclaimer, the term of this patent is extended or adjusted under 35 U.S.C. 154(b) by 651 days.

(21) Appl. No.: 11/747,090

(22) Filed: May 10, 2007

(65) Prior Publication Data

US 2008/0279160 A1    Nov. 13, 2008

Related U.S. Application Data

(60) Provisional application No. 60/843,957, filed on Sep. 11, 2006.

(51) Int. Cl.
*H04W 4/00* (2009.01)

(52) U.S. Cl. ............ 370/338; 370/310.2; 370/328; 455/3.01; 455/3.06; 455/502; 455/507; 725/62; 725/63; 348/14.01; 348/14.02

(58) Field of Classification Search ......... 370/311, 370/318, 328, 338, 350, 324, 310.2; 455/3.06, 455/3.01, 502, 507, 522; 725/62, 63; 348/14.01, 348/14.02
See application file for complete search history.

(56) References Cited

U.S. PATENT DOCUMENTS

| | | | |
|---|---|---|---|
| 6,865,510 B2 * | 3/2005 | Engbrecht | 702/182 |
| 7,088,702 B2 | 8/2006 | Shvodian | |
| 7,284,046 B1 * | 10/2007 | Kreiner et al. | 709/223 |
| 2004/0095891 A1 * | 5/2004 | Nakagawa | 370/252 |
| 2004/0160930 A1 * | 8/2004 | Choi et al. | 370/338 |

(Continued)

FOREIGN PATENT DOCUMENTS

KR    1020040089338 A    10/2004

(Continued)

OTHER PUBLICATIONS

IEEE 802.15.3 Working Group, Part 15:3: Wireless medium access control (MAC) and physical layer (PHY) specifications for high rate wireless personal area networks (WPAN). Sep. 23, 2003.

(Continued)

*Primary Examiner*—Kent Chang
*Assistant Examiner*—San Htun
(74) *Attorney, Agent, or Firm*—Knobbe Martens Olson & Bear LLP

(57) ABSTRACT

A system and method for wireless communication having a device coordinator selection capability are disclosed. In one aspect, the method comprises determining a coordinator priority of each device based on a static priority table, the table assigning a priority to each type of devices. The method further comprises selecting a first device among the plurality of devices as the coordinator based at least in part on the coordinator priority of each device, and a coordinator candidate from the plurality of devices except the current coordinator, based on the coordinator priority of each device and probing results.

28 Claims, 5 Drawing Sheets

U.S. PATENT DOCUMENTS

| | | | |
|---|---|---|---|
| 2004/0255001 A1* | 12/2004 | Oh et al. ..................... | 709/209 |
| 2005/0180385 A1* | 8/2005 | Jeong et al. ................. | 370/350 |
| 2006/0114867 A1* | 6/2006 | Du et al. ..................... | 370/338 |
| 2007/0064742 A1* | 3/2007 | Shvodian .................... | 370/503 |

FOREIGN PATENT DOCUMENTS

KR      1020050081508 A      8/2005

OTHER PUBLICATIONS

Shig Sugaya, Kaz Takamura, Masa Akahane, Sony Corporation "IEEE802.15.3: A proposal to add geographical coverage based criteria to PNC selection." Sep. 17, 2001.

IEEE Draft P802.15.3/D16, Part 15:3: Wireless medium access control (MAC) and physical layer (PHY) specifications for high rate wireless personal area networks (WPAN). Feb. 2003.

International Search Report and Written Opinion for PCT/KR2007/004389 dated Dec. 14, 2007.

Yeufeng Zhou, David I. Laurenson, Stephen McLaughlin, "A Novel Piconet Coordinator Selection Method for IEEE802.15.3-Based WPAN." International Workshop on Wireless Ad -Hoc Networks, IWWAN 2005.

FreshNews.com, SiBEAM Receives Equity Investment from Best Buy, http://freshnews.com/print/node/261440, Jan. 4, 2010, 2 pages.

Hachman, "CE Giants back Amimon's Wireless HDTV Tech," online: www.pcmag.com, 1 page, Jul. 23, 2008.

LG Electronics Inc., WirelessHD Specification Version 1.0 Overview, Oct. 9, 2007, 77 pages.

NEC develops compact millimeter-wave transceiver for uncompressed HDTV signal transmission, NE Asia Online, Apr. 5, 2005, (Downloaded from http://neasia.nikkeibp.com/topstory/000913 on Sep. 29, 2006.).

* cited by examiner

SYSTEM AND METHOD FOR WIRELESS COMMUNICATION HAVING A DEVICE COORDINATOR SELECTION CAPABILITY

CROSS REFERENCE TO RELATED APPLICATIONS

This application claims priority under 35 U.S.C. §119(e) to U.S. provisional patent application 60/843,957 filed on Sep. 11, 2006, which application is hereby incorporated by reference in its entirety.

BACKGROUND OF THE INVENTION

1. Field of the Invention

The present invention relates to wireless communication, and more particularly, to wireless communication having a device coordinator.

2. Description of the Related Technology

A coordinator plays a central role in managing some wireless networks. Usually only one coordinator is needed for a certain area. A coordinator may be configured to, for example, perform one or more of the following functions: time-synchronization of all devices, association/disassociation management, device capability and/or location management, connection control, scheduling according to stream/traffic specification, link assessment and dynamic channel switching (if needed), broadcast and multicast, and security management including key management, authentication and digital rights management. In order to perform these functions, it is desirable that the coordinator meets certain requirements such as: 1) hardware/software capable to perform coordinator functions; 2) no mobility; 3) line powered, 4) able to communicate with all devices using the low-rate control channel, 4) be on continuously, and 5) having good interface with users or higher layer. Therefore, a good coordinator management scheme is critical to ensure that a device suitable for the coordinator function acts as the coordinator.

SUMMARY OF CERTAIN INVENTIVE ASPECTS

The system, method, and devices of the invention each have several aspects, no single one of which is solely responsible for its desirable attributes. Without limiting the scope of this invention, its more prominent features will now be briefly discussed.

In one aspect, there is a method of managing a plurality of devices in a system for wireless communication. The method comprises determining a coordinator priority of each device based on a static priority table, the table assigning a priority to each type of devices. The method further comprises selecting a first device among the plurality of devices as the coordinator based at least in part on the coordinator priority of each device.

In another aspect, there is a method of managing a plurality of devices in a system for wireless communication. The method comprises determining at a device the priority of the device based on a plurality of priority groups, each priority group comprising devices having the same priority.

In another aspect, there is a device for performing medium access control in a system for wireless communication. The device comprises a receiver to receive messages from another device. The device further comprises a transmitter to transmit messages to another device. The device further comprises a static priority table which associates a priority for being selected as an coordinator to each of a plurality of device types. The method further comprises a control module configured to determine the coordinator priority of the device by looking up the corresponding device type in the static priority table.

In another aspect, there is a system for wireless communication. The system comprises means for determining a coordinator priority of each device based on a static priority table, the table assigning a priority to each type of devices. The system further comprises means for selecting a first device among the plurality of devices as the coordinator based at least in part on the coordinator priority of each device, and a coordinator candidate from the plurality of devices except the current coordinator, based on the coordinator priority of each device and probing results.

DETAILED DESCRIPTION OF CERTAIN INVENTIVE EMBODIMENTS

Figure 1:
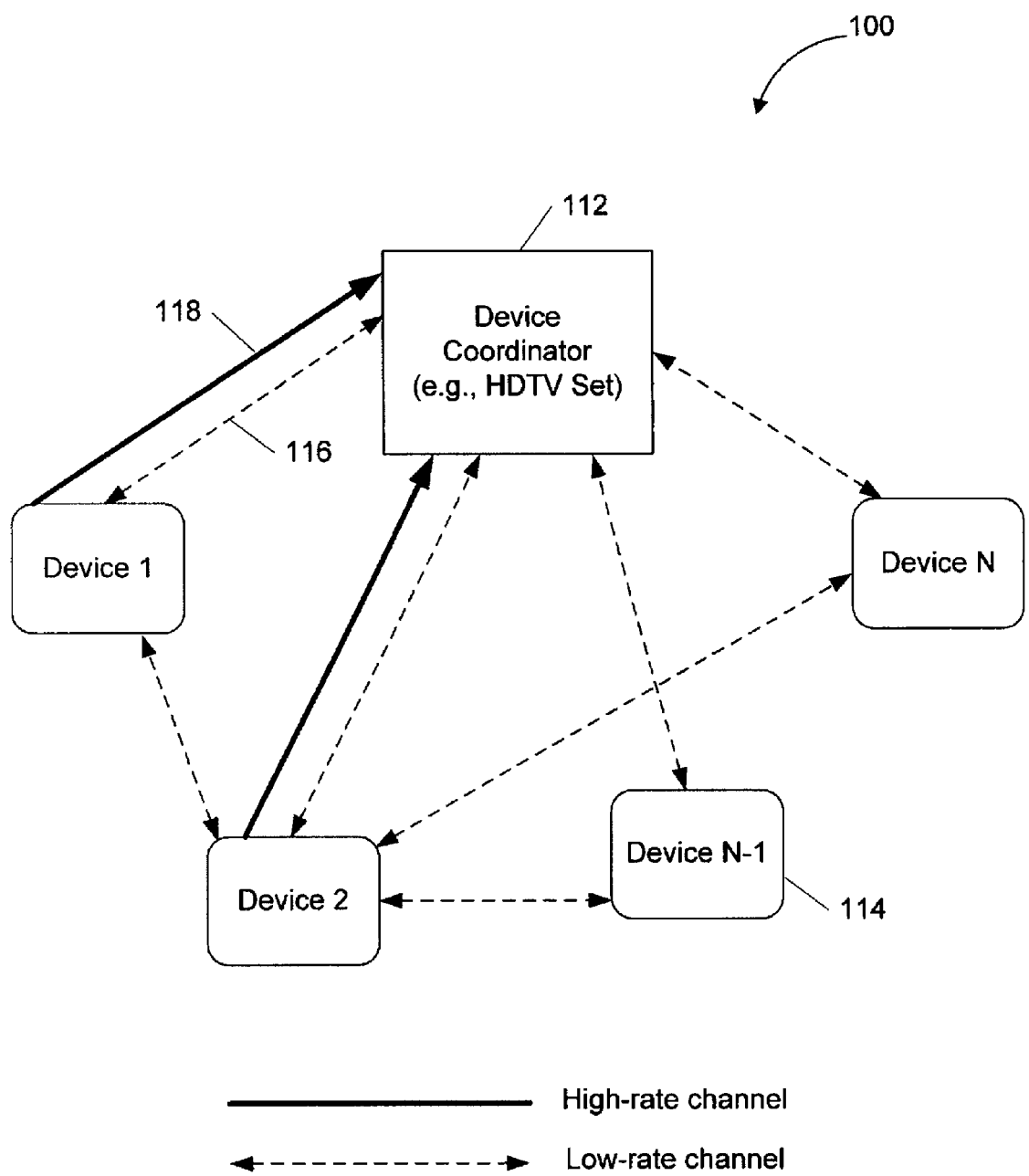
FIG. 1 is a functional block diagram of a wireless network that implements uncompressed HD video transmission between wireless devices according to one embodiment of the system and method.

Various aspects and features of the invention will become more fully apparent from the following description and appended claims taken in conjunction with the foregoing drawings. In the drawings, like reference numerals indicate identical or functionally similar elements. In the following description, specific details are given to provide a thorough understanding of the disclosed methods and apparatus. However, it will be understood by one of ordinary skill in the technology that the disclosed systems and methods may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations may be performed in parallel or concurrently and the process may be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Certain embodiments provide a method and system for transmission of uncompressed HD video information from a sender to a receiver over wireless channels. Though described in the context of transmitting uncompressed video information, these embodiments should not be limited thereto.

Instead, they can be used for any kind of wireless communication, including, for example, transmission of other content or information.

With the proliferation of high quality video, an increasing number of electronic devices, such as consumer electronic devices, utilize high definition (HD) video which can require multi-Gbps (gigabits per second) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices that do not have the bandwidth to carry the uncompressed HD signals are connected to the network.

Example implementations of the embodiments in a wireless high definition (HD) audio/video (A/V) system will now be described. FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1, . . . , Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118 for communication with the stations 114. Each station 114 uses the low-rate channel 116 for communications with other stations 114. The high-rate channel 118 supports single direction unicast transmission over directional beams established by beamforming, with e.g., multi-Gb/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, a digital camera, a camcorder, and so forth.

Figure 2:
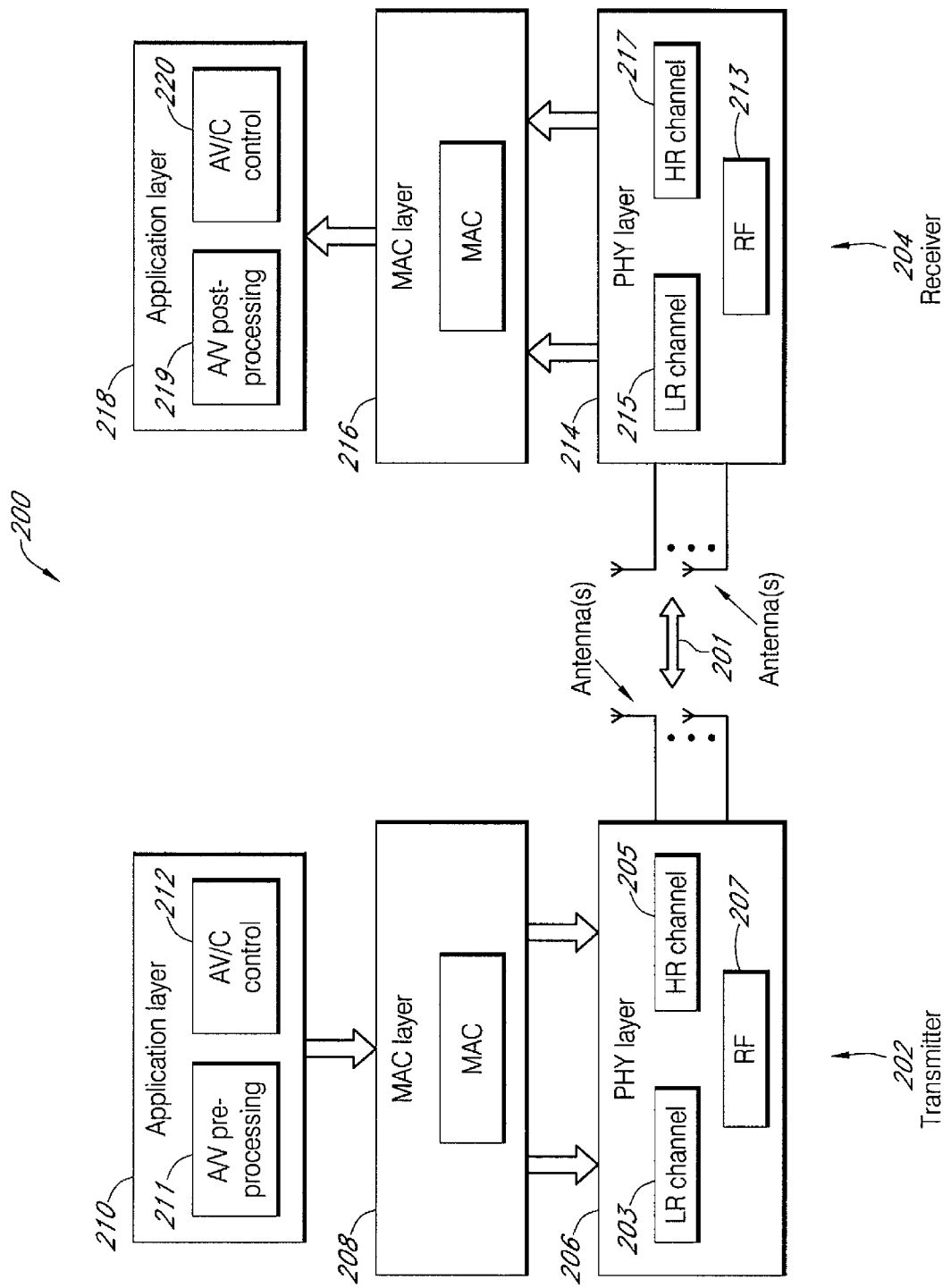
FIG. 2 is a functional block diagram of an example communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216 process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Certain embodiments of a coordinator management scheme for a wireless network will be described below. These embodiments are designed for a wireless network optimized for the delivery of audio and video data with high quality of service characteristics. Compared to conventional schemes such as the coordinator management scheme of IEEE 802.15.3, these embodiments have easy implementation, less protocol overhead, and better quality of service control. It should be noted that though described in the context of a wireless network optimized for delivery of audio and video data, these embodiments may be equally applicable to other wireless networks.

Figure 3:
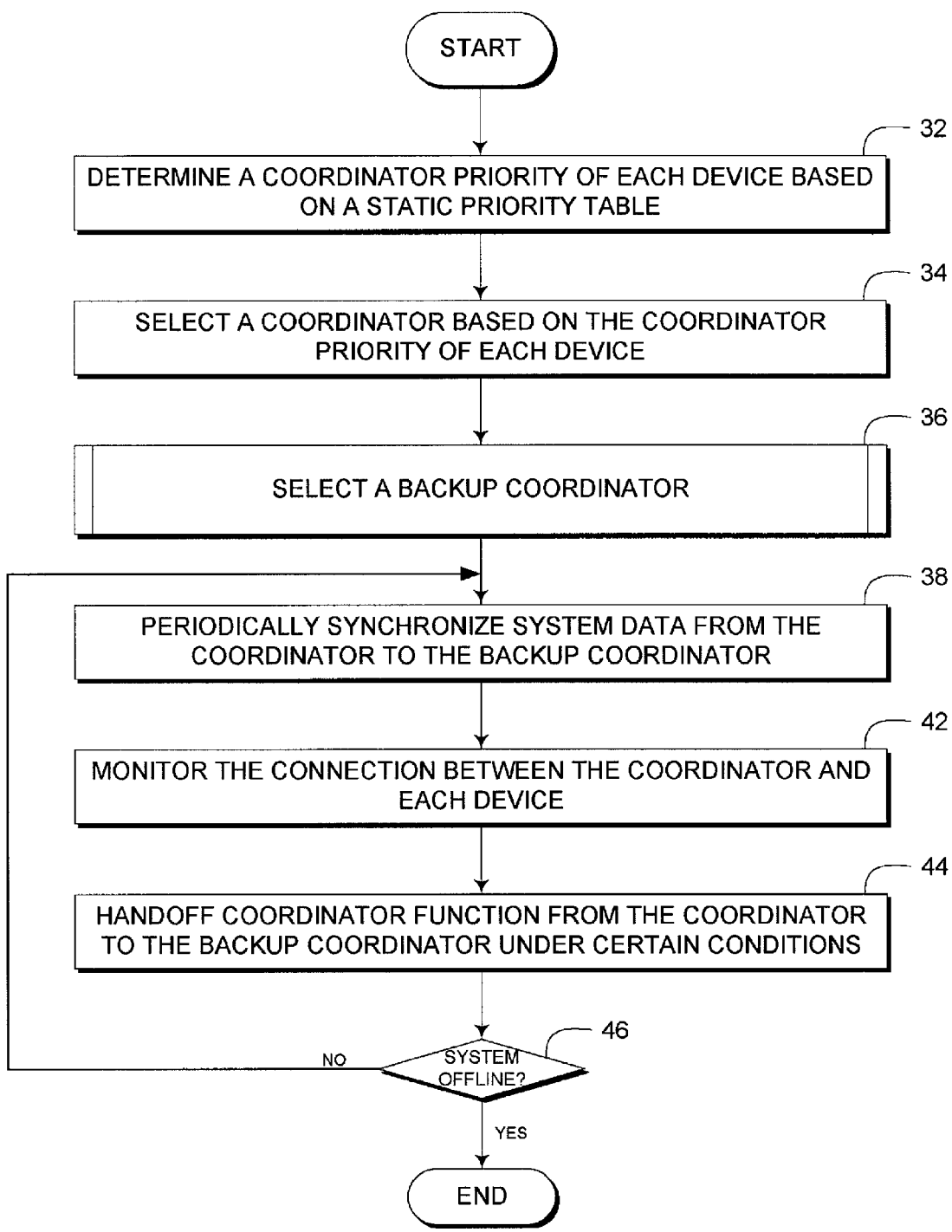
FIG. 3 is a flowchart illustrating one embodiment of a method of managing a wireless network high definition audio/video network.

FIG. 3 is a flowchart illustrating one embodiment of a method of managing a wireless network high definition audio/video network. The wireless network includes a plurality of devices. Depending on the embodiment, certain elements of the method may be removed, merged together, or rearranged in order.

The method begins at a block 32, wherein each device determines whether it is coordinator-capable and its coordinator priority based on a static priority table stored in that device. In general, each device within the wireless network has the same static priority table stored therein. The static priority table assigns a priority order for being selected as a coordinator to each type of devices based on the common usage and attributes of the type of devices and the general requirement for a coordinator. In one embodiment, each device may simply look up its device type in the table and retrieve the coordinator priority corresponding to its device type.

One example of the table is shown below in Table 1 with the lowest number in priority order column corresponding to the highest priority.

TABLE 1

| Priority Order | Devices |
| --- | --- |
| 1 | DTV |
| 2 | PC |
| 3 | Set top Box |
| 4 | DVD/BD Recorder |
| 5 | DVD/BD Player |
| 6 | A/V receiver (home theater) |
| 7 | Game Console |

Another example of the table is shown below in Table 2. In Table 2, devices are divided into three groups with decreasing priority: top, primary, and non-primary. Devices in primary group are AC-powered and non-mobile. Devices in the non-primary group are the mobile devices. Digital television set (DTV) has the top priority because its capabilities make it the desirable coordinator in some applications.

TABLE 2

| Priority Order | Devices |
| --- | --- |
| Top | DTV |
| Primary | Set Top Box |
| | DVD/BD player |
| | DVD/BD recorder |
| | A/V Receiver (Home theater) |
| | PC |
| | Beam Projector |
| Non-primary | Game Console |
| | Camcorder |
| | Digital Camera |
| | PDA |
| | PMP |
| | MP3 player |
| | Cellular phone |
| | Others |

It will be appreciated that any suitable priority table may be used. In one embodiment, when assigning a priority to each device, certain factors may be considered. For example, it may be desirable that AC powered devices have a higher coordinator priority than battery powered devices. In another example, devices having more processing power and/or memory have higher priority. In another example, devices being on for a longer time have higher priority. In another example, devices having a display have higher priority than devices having no display.

Some wireless network may include both coordinator-capable and non-coordinator-capable devices. The table may or may not include the non-coordinator-capable devices. If the table does not include the non-coordinator-capable devices, then at the block 32, each device also determines whether it is coordinator-capable by, for example, reading a status indicator stored at the device. If the table includes the non-coordinator-capable devices, the table will assign a lowest priority to the non-coordinator-capable devices. The device can detect whether it is a non-coordinator-capable devices by looking at the retrieved coordinator priority.

Next at a block 34, a coordinator is selected based on the coordinator priority of each device. There may be many ways to select a coordinator from the devices in a wireless network once each device has determined its own priority order. In the exemplary embodiment, each coordinator-capable device determines an amount of waiting time based on its coordinator priority determined in block 32. A lower coordinator priority corresponds to a longer waiting time. For the device having the highest rank, the waiting time may be zero. For devices which are non-coordinator-capable, the waiting time may be infinite. The device will scan the control channel (e.g., the LR channel 116) for beacons (i.e. beacon signals). Beacons are packets that are transmitted periodically from the coordinator to all other devices, which typically include control information, such as timing information and transmission schedules. If no beacons are heard within the waiting time, the device will start to broadcast beacons and act as a coordinator.

Sometimes there may be a beacon collision, e.g., multiple beacons transmitted. There are many ways to detect beacon collision. For example, after a device starts to broadcast beacons, if it does not receive any uplink traffic and no other beacons are heard, it will determine that there may be a possible beacon collision. The device will wait for some random time, stop broadcasting beacons, and scan the channels again. If a device discovers multiple beacons, it will report to all the devices which it receives beacon from. The device broadcasting beacons may also hear beacons sent by other devices.

In case of a beacon collision, the lower priority coordinator will hand off to the higher priority coordinator. Ties are broken by, for example, the network/MAC address. A higher address may have the priority over a lower address. This can happen if there are multiple devices of the same type, such as multiple TVs.

Moving to a block 36, a backup coordinator is selected from coordinator-capable devices other than the coordinator. A probing procedure is used to verify whether the coordinator has good connections with other devices in the process of selecting a backup coordinator. The backup coordinator will take over the coordinator function in case that the coordinator does not work well for some reasons. Block 36 will be described in further detail with reference to FIG. 4.

Next at a block 38, the coordinator will periodically synchronize system data to the backup coordinator. The system data may include, e.g., network information and current schedules. Periodically, the coordinator will also probe the backup coordinator to make sure it is still functioning well, and also ask the backup coordinator to probe all other devices to check the link status.

Moving to a block 42, the connections between the coordinator and other devices are monitored by the coordinator and the other devices. If a device can not hear beacons, it will broadcast a message informing others that it has a bad connection, at the random access period. The devices which receive this message will report to the coordinator. The coordinator will schedule to probe that device after it receives the report. The coordinator also actively monitors the connections to other devices. If the coordinator hasn't heard from a device for a pre-determined time, it will probe that device.

Next at a block 44, a handoff of the coordinator function from the coordinator to the backup coordinator is performed under certain conditions. These conditions may include, for example, a) the coordinator is scheduled to shut down, b) the coordinator is abruptly shut down, c) the coordinator has bad connections with some of the devices, d) a higher priority coordinator joins the network, and e) multiple coordinators exist. Many of the existing handoff schemes such as the handoff schemes in IEEE 802.15.3 may be used to perform the handoff process in this embodiment.

The method will move back to block 38 at a block 46 unless the system is offline under some conditions, e.g., network shutdown.

Compared to many existing approaches which determine the coordinator priority of each device in run time based on a substantial amount of factors, the embodiment presented here requires merely looking up a static priority table stored in each device. This reduces the protocol overhead. Further, the table is generated based on the common usage and attributes of each type of devices and the requirement for a coordinator. In one embodiment, the table is optimized for a wireless network configured to deliver audio and video data with high quality of service characteristics. Therefore, a coordinator selected based on the static priority table often provides better quality of service control than a coordinator selected using existing approaches.

In the above embodiment, the device looks up a static priority table stored within the device to determine its priority order. In another embodiment, a coordinator priority order instead of the static priority table is stored within the device. The coordinator priority order is, for example, a number which is determined based on the static priority table when the device is manufactured. This removes the need for the device to store and look up a static priority table.

Figure 4:
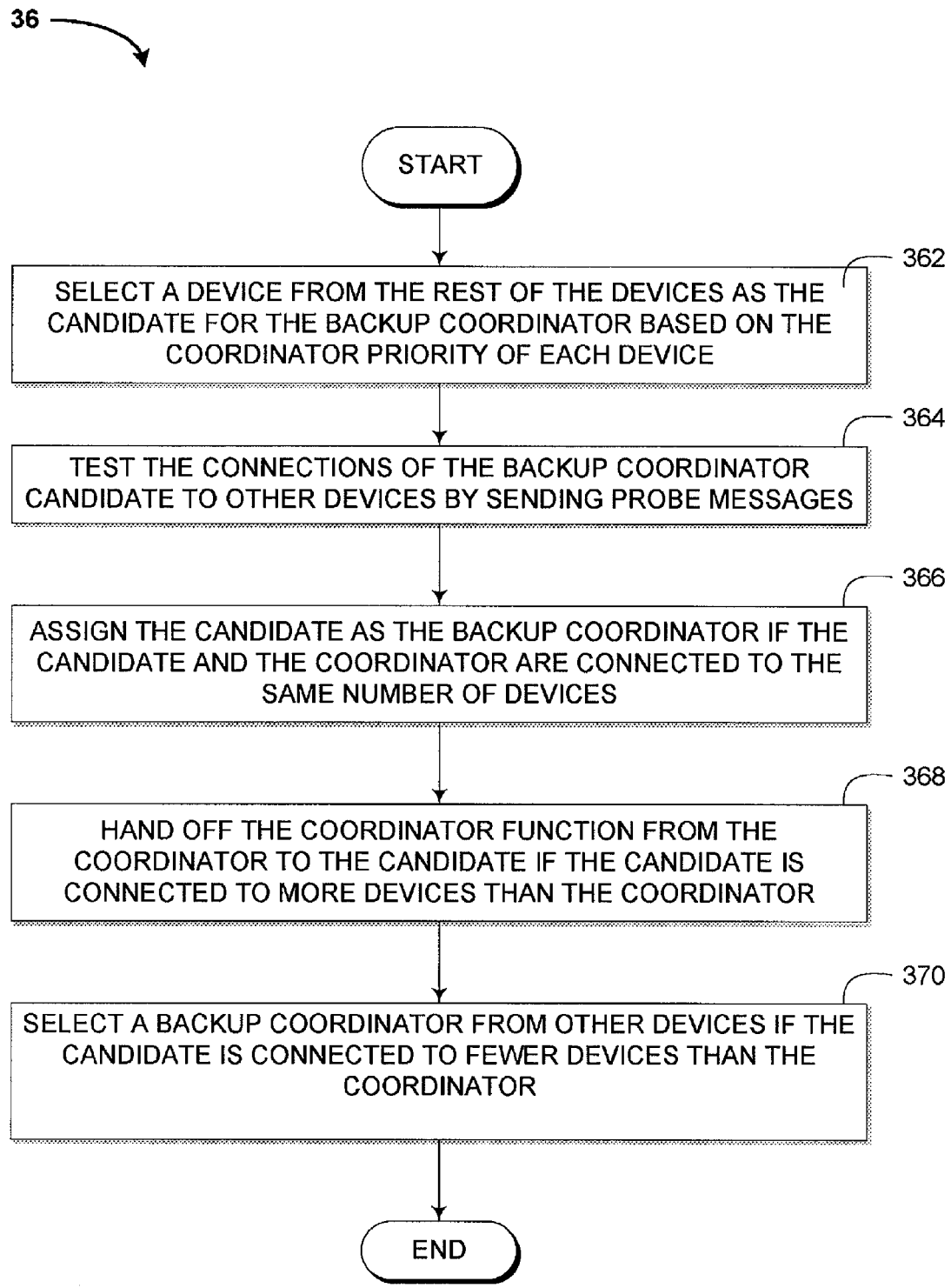
FIG. 4 is a flowchart illustrating one embodiment of the process to select a backup coordinator shown in FIG. 3.

FIG. 4 is a flowchart illustrating one embodiment of the process to select a backup coordinator shown in FIG. 3. Depending on the embodiment, certain steps of the method may be removed, merged together, or rearranged in order.

The method starts at a block 362, where the coordinator selects a device as the candidate for the backup coordinator from the rest of the devices (devices other than the coordinator) based on the coordinator priority of each device. In one embodiment, the coordinator selects a device which has the highest priority among the rest of the devices. Ties are broken by, for example, the network address. A higher address may have the priority over a lower address.

Next at a block 364, the backup coordinator candidate tests its connections to other devices by sending probe messages. In one embodiment, the coordinator first sends a message requesting the candidate to test its connections. The candidate may then evaluate the link quality of its connections to other devices based on other devices' responses to the probe messages.

The method then moves to one of blocks 366, 368, and 370 depending on whether the candidate is connected to a number of devices fewer than, equal to, or more than the coordinator is. If the candidate is connected to the same number of devices, the coordinator will determine that both the coordinator and the candidate have good connections to other devices. The coordinator then will assign the candidate as the backup coordinator. If the candidate is connected to more devices than the coordinator, the coordinator will determine that it does not have good connections to other devices. The coordinator will then hand off the coordinator function to the candidate.

If the candidate is connected to fewer devices than the coordinator, the coordinator may determine that the candidate does not have good connections to other devices. In that case, the coordinator will keep looking to select a backup coordinator from devices other than the coordinator and the second device. In one embodiment, the coordinator may repeat the processes starting from block 362 until a device is identified which is connected to a number of devices equal to or more than the coordinator. Such a device will be selected as the backup coordinator. Otherwise, the coordinator will select the device having the highest number of connections to other devices among the devices other than the coordinator as the backup coordinator.

In the exemplary embodiment, whether the candidate is connected to the same number of devices is used to determine whether the candidate and the coordinator have good connections to other devices. It should be noted that the criteria may be easily modified to fit various circumstances. For example, in another embodiment, the coordinator will determine that the candidate and the coordinator have good connections to other devices if the difference between the connections of the candidate and of the coordinator is within a pre-determined number, e.g., 2.

While the existing approaches require each coordinator-capable device to test its connections to other devices, the above embodiments require, in most cases, only one or two devices to probe its connections to other devices. This reduces the protocol overhead substantially, especially when the wireless network includes a large number of devices.

Figure 5:
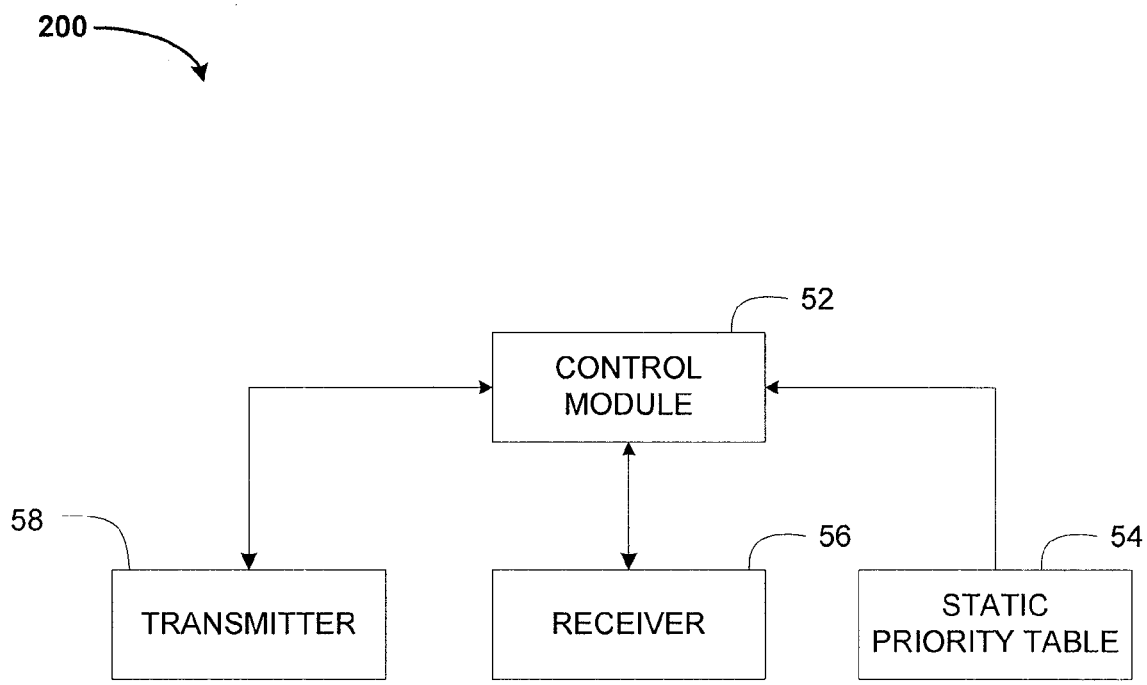
FIG. 5 is a functional block diagram of one embodiment of a device suitable for managing a wireless network according to a method presented herein.

FIG. 5 is a functional block diagram of one embodiment of a device suitable for managing a wireless network according to a method presented herein. The device 200 may be coordinator-capable or non-coordinator-capable. The device 200 may act as the device coordinator 112 or other devices 114 in a wireless network shown in FIG. 1, depending on whether it is selected as the coordinator or not.

The device 200 includes a static priority table 54 as discussed above with regard to FIG. 3. The device may also include a transmitter 58 to transmit a message to one or more devices and a receiver 56 to receive a message from another device. The transmitter and receiver may be any suitable devices.

The device 200 may include a control module 52 configured to control the operation of the device. In one embodiment, the control module 52 is a processor which may be any suitable general purpose single- or multi-chip microprocessor, or any suitable special purpose microprocessor such as a digital signal processor, microcontroller, or a programmable gate array. As is conventional, the processor may be configured to execute one or more software applications. In certain embodiments, the control module 52 runs a software application in communication with the static priority table 54, receive 56, and transmitter 58. The control module is configured to determine the coordinator priority of the device by looking up the static priority table. The control module may also be configured to perform at least a portion of the process in the method of managing a wireless network, depending on whether it is coordinator-capable and whether it is selected as a coordinator.

In the embodiments described herein, the static priority table may be replaced with a table as shown below in Table 3.

TABLE 3

| Priority Order | Devices | Order ID |
|---|---|---|
| Top | DTV | 0 |
| Primary | STB | 1 |
|  | DVD/BD/HD-DVD player | 2 |
|  | DVD/BD/HD-DVD recorder | 3 |
|  | A/V receiver | 4 |
|  | Personal computer | 5 |
|  | Video projector | 6 |
| Non-primary | Game console | 7 |
|  | Digital video camera | 8 |
|  | Digital still camera | 9 |
|  | PDA | 10 |
|  | PMP | 11 |
|  | MP3 player | 12 |

TABLE 3-continued

| Priority Order | Devices | Order ID |
| --- | --- | --- |
|  | Cell phones | 13 |
|  | Others | 14 |

As illustrated, each device is assigned two values indicating the coordinator priority: Priority Order (group priority) and Order ID (individual priority). Depending on the type of decisions to be made, one of the values is used to represent the coordinator priority of the device. Table 3 thus may provide more flexibility for coordinator management. For example, when making a decision about whether a handoff should be triggered when a device joins the network, the Priority Order is used to compare the coordinator priority. Since there are only three levels for Priority Order, the handoff does not happen frequently. In contrast, when choosing the backup coordinator, the Order ID is used instead of the Priority Order to compare the coordinator priority of different devices. In one embodiment, the Table 3 may be divided into two separate tables, such as Table 1 and 2 above. One of Table 1 and 2 is used to calculate the coordinator priority depending on the type of decisions to be made.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of managing a plurality of devices in a system for wireless communication, wherein the method is performed by one or more of the plurality of devices, the method comprising:
   determining, at each of the plurality of devices, a coordinator priority of the device based on a static priority table stored on the device, the coordinator priority being representative of a priority for being selected as a coordinator, the table assigning a priority for being selected as a coordinator to each type of device;
   selecting a first device among the plurality of devices as the coordinator based at least in part on the coordinator priority of each device; and
   when a device joins, handing off the coordinator function from the coordinator to the device if the device has a higher group priority than the coordinator based on a plurality of priority groups, each priority group comprising devices having the same group priority.

2. The method of claim 1, wherein the selecting of a first device comprises assigning a device as the coordinator if no beacon signal is received by the device in a waiting period, the length of the waiting period being based at least in part on the coordinator priority of the device.

3. The method of claim 1, wherein the length of the waiting period decreases when the coordinator priority becomes higher.

4. The method of claim 1, wherein the coordinator has the highest coordinator priority among the devices.

5. The method of claim 1, wherein a television set has the highest coordinator priority in the static priority table.

6. The method of claim 1, wherein non-mobile devices have a higher coordinator priority than mobile devices in the static priority table.

7. The method of claim 1, wherein AC powered devices have a higher coordinator priority than battery powered devices.

8. The method of claim 1, wherein devices having more processing power and/or memory have higher priority.

9. The method of claim 1, wherein devices being on for a longer time have higher priority.

10. The method of claim 1, wherein the plurality of priority groups are stored in the static priority table.

11. The method of claim 1, wherein the plurality of priority groups are stored separate from the static priority table.

12. The method of claim 1, further comprising:
    selecting a second device from the remaining devices based on the coordinator priority of each device; and
    testing the connections of the second device to other devices.

13. The method of claim 12, wherein the testing of the connections comprises sending probe messages from the second device to other devices.

14. The method of claim 12, wherein the testing of the connections further comprises evaluating the connection between the second device to each of the other devices based on whether a reply message is received and the information within the reply message.

15. The method of claim 1, further comprising reporting, at a device, a bad connection to the coordinator by broadcasting a message at a random access period if the device has not heard from the coordinator for a pre-determined period.

16. The method of claim 15, further comprising reporting to the coordinator, at another device, information included in the broadcasted message if another device receives the message.

17. The method of claim 1, further comprising probing, at the coordinator, a device if the coordinator has not heard from the device for a pre-determined period.

18. The method of claim 1, further comprising:
    selecting a backup coordinator from the remaining devices; and
    periodically sending system data from the coordinator to the backup coordinator for synchronization.

19. A method of managing a plurality of devices in a system for wireless communication, wherein the method is performed by one or more of the plurality of devices, the method comprising:
    determining, at each of the plurality of devices, a coordinator priority of the device based on a static priority table stored on the device, the coordinator priority being representative of a priority for being selected as a coordinator, the table assigning a priority for being selected as a coordinator to each type of device;
    selecting a first device among the plurality of devices as the coordinator based at least in part on the coordinator priority of each device;
    selecting a second device from the remaining devices based on the coordinator priority of each device;

testing the connections of the second device to other devices; and assigning the second device as the backup coordinator if the second device and the coordinator are connected to the same number of devices.

20. A method of managing a plurality of devices in a system for wireless communication, wherein the method is performed by one or more of the plurality of devices, the method comprising:

determining, at each of the plurality of devices, a coordinator priority of the device based on a static priority table stored on the device, the coordinator priority being representative of a priority for being selected as a coordinator, the table assigning a priority for being selected as a coordinator to each type of device;

selecting a first device among the plurality of devices as the coordinator based at least in part on the coordinator priority of each device;

selecting a second device from the remaining devices based on the coordinator priority of each device;

testing the connections of the second device to other devices; and handing off the coordinator function from the coordinator to the second device if the second device is connected to more devices than the coordinator.

21. A method of managing a plurality of devices in a system for wireless communication, wherein the method is performed by one or more of the plurality of devices, the method comprising:

determining, at each of the plurality of devices, a coordinator priority of the device based on a static priority table stored on the device, the coordinator priority being representative of a priority for being selected as a coordinator, the table assigning a priority for being selected as a coordinator to each type of device;

selecting a first device among the plurality of devices as the coordinator based at least in part on the coordinator priority of each device;

selecting a second device from the remaining devices based on the coordinator priority of each device;

testing the connections of the second device to other devices; and selecting a third device from the devices other than the coordinator and the second device based on the coordinator priority of each device and testing its connections to other devices, if the second device is connected to fewer devices than the coordinator.

22. A method of managing a plurality of devices in a system for wireless communication, wherein the method is performed by one or more of the plurality of devices, the method comprising:

determining, at each of the plurality of devices, a coordinator priority of the device based on a static priority table stored on the device, the coordinator priority being representative of a priority for being selected as a coordinator, the table assigning a priority for being selected as a coordinator to each type of device;

selecting a first device among the plurality of devices as the coordinator based at least in part on the coordinator priority of each device;

selecting a second device from the remaining devices based on the coordinator priority of each device; and testing the connections of the second device to other devices, wherein the process of selecting a second device and testing the connections of the second device is repeated, each time with a different device being selected as the second device, until a second device is selected which has connections to devices no fewer than the coordinator or each of the devices other than the coordinator has been selected as the second device.

23. A device for performing medium access control in a system for wireless communication, the device comprising:

a static priority table stored on the device which associates a priority for being selected as a coordinator to each of a plurality of device types; and a control module configured to determine the coordinator priority of the device by looking up the corresponding device type in the static priority table, wherein the control module is further configured to, if the device is assigned as the coordinator, select a second device from the rest of devices based on the priority of each device and request the second device to test the connections of the second device to other devices by sending probe messages, wherein the control module is further configured to, if the device is assigned as the coordinator, hand off the coordinator function from the coordinator to the second device if the second device is connected to more devices than the coordinator.

24. The device of claim 23, wherein the control module is further configured to assign the device as the coordinator if no beacon signal is received in a waiting period, the length of the waiting period being based at least in part on the coordinator priority of the device.

25. The device of claim 23, wherein the control module is further configured to, if the device is assigned as the coordinator, select a second device from the rest of devices based on the priority of each device and request the second device to test the connections of the second device to other devices by sending probe messages.

26. The device of claim 23, wherein the control module is further configured to, if the device is assigned as the coordinator, hand off the coordinator function from the coordinator to the second device if a higher priority device joins.

27. The device of claim 23, further comprising a transmitter to transmit messages to another device.

28. The device of claim 23, further comprising a receiver to receive messages from another device.

* * * * *